United States Patent

[11] 3,594,589

| [72] | Inventor | Robert L. Hall<br>Marblehead, Mass. |
|---|---|---|
| [21] | Appl. No. | 21,992 |
| [22] | Filed | Mar. 23, 1970 |
| [45] | Patented | July 20, 1971 |
| [73] | Assignee | Massachusetts Institute of Technology<br>Cambridge, Mass. |

[54] SAMPLE AND HOLD CIRCUIT
5 Claims, 4 Drawing Figs.

[52] U.S. Cl. .................................................. 307/235,
307/246, 307/251, 328/151
[51] Int. Cl. ..................................................... H03k 5/20,
H03k 17/60
[50] Field of Search ........................................... 307/235,
246, 251, 255; 328/121—126, 58, 151

[56] References Cited
UNITED STATES PATENTS

| 2,840,707 | 6/1958 | Johnson, Jr. ................. | 328/151 X |
| 2,881,255 | 4/1959 | Hall ................................ | 328/151 X |
| 2,902,674 | 9/1959 | Billings et al. ................. | 307/238 X |
| 3,363,113 | 1/1968 | Bedingfield ..................... | 328/121 |
| 3,470,482 | 9/1969 | Kolnowski .................... | 328/151 X |

OTHER REFERENCES

Pub. 1. " Instantaneous Analog Storage Circuit" by Bartz et al. in IBM TECH DISCLOSURE BULLETIN, Vol. 7, No. 2, dated July 64, pages 124— 125 Copy in 307-246

*Primary Examiner*—Stanley D. Miller, Jr.
*Attorneys*—Thomas Cooch, Arthur A. Smith, Jr. and Martin M. Santa

ABSTRACT: A circuit for maintaining the level of an output signal at a value which is essentially equal to the value of a periodically sampled input signal, said circuit including a pair of gates which are made simultaneously conductive over a controlled sampling time interval whereby an input signal is applied to a storage device which thereupon produces an output signal, the level of which is maintained for a particular time period at the level of the sampled input signal.

# SAMPLE AND HOLD CIRCUIT

This application is a continuation-in-part of application Ser. No. 660,436, filed Aug. 14, 1967, now abandoned.

BACKGROUND OF THE INVENTION

1. Field of the Invention

This invention relates generally to sample and hold circuits for maintaining the value of a signal at a specified level and, more particularly, to an improvement in such sample and hold circuits wherein the level of an output signal is maintained for specified period of time at a value corresponding to the value of a variable input signal during a selected sampled interval of time.

2. Description of the Prior Art

In many applications in which the amplitude of a signal, for example, may be varying over a relatively wide range, it is often desirable to sample the value of such signal at a particular interval in time and to produce a signal in response thereto which is maintained at such value over a relatively longer period of time. For example, in computer systems where the value of a particular input signal is cyclically sampled at prescribed intervals of time, it is desirable to produce an output signal in response thereto having the same value that the input signal had during the sampled time interval and to maintain the output signal at such value until the input signal is again sampled at a later time interval. The value of the output signal is thereupon changed to the new sampled value where it is again retained at such new value until the next sampled interval. Such circuitry may be found useful in high-speed computers, particularly of the multiaccess type, wherein the sampled values of many different input signals must be retained during the time periods between each sampled interval.

A common problem with presently available sample and hold circuits is the precision with which the sampling is effected. The less precise the determination of sample time, the greater the circuit error source. Attempts to achieve extremely high precision usually result in significant increases in circuit complexity.

SUMMARY OF THE INVENTION

In view of the aforementioned limitation of presently available sample and hold circuits, it is an object of the invention to provide an extremely precise and controllable sample and hold circuit comprising minimal circuitry.

This and other objects are met by a sample and hold circuit in which the input signal to be sampled is applied via a pair of gating circuits to a suitable storage means, such as a capacitor which is charged up to the value of such input signal. A control signal controls the operation of such gates so that both gates are made simultaneously conductive only for a controlled interval of time so as to apply the input signal to the capacitor during such interval. In the invention, a single control signal is used to control the operation of both gates, one of the gates being operated, as described in more detail later, via an amplifier which reverses polarity, the gain of which determines the interval of time over which both gates are made conductive. After the input signal has been appropriately sampled and the capacitor thereupon charged, the output signal from the sample and hold circuit is maintained at the charged value for a prescribed period of time until the same input signal is again sampled, whereupon the value of the output signal is changed to and maintained at a new sampled value in the same manner.

Further objects, features and advantages of the present invention and a better understanding thereof will become apparent with the following detailed description taken in conjunction with the accompanying drawings.

Drawings

PREFERRED EMBODIMENT

Figure 1:
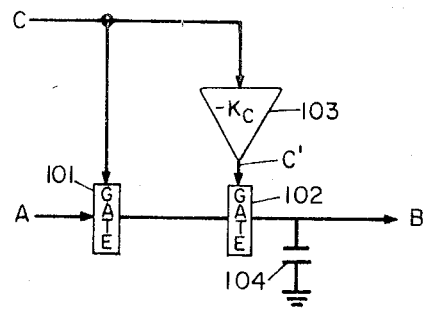
FIG. 1 is a block diagram showing a general embodiment of the invention.

In the representative circuitry of FIG. 1, an output signal B having a value equal to input signal A is not produced until both gate 101 and gate 102 are simultaneously placed in conductive states by control signal C which is fed directly to gate 101 and indirectly to gate 102 through an operational amplifier 103 which inverts polarity. Amplifier 103 has a gain indicated by $(-K_c)$, and is used to amplify and change the polarity of control signal C to produce a control signal identified in FIG. 1 as signal C'. When such control signal causes gates 101 and 102 to become simultaneously conductive, the voltage value of input signal A is applied via gates 101 and 102 to a condenser 104 which thereupon charges up to the value of signal A. When gate 101 is subsequently made nonconductive, signal a is no longer applied to condenser 104 but output signal B is retained at the value of signal A to which such condenser has been charged for a period of time dependent on the time constant of the condenser circuit (i.e., the time at which such signal decays to a specified percentage of its initially charged value). Such time constant may be arranged to be relatively long in comparison to the recycling, or sampling, time period of a computer subsystem, for example, in which the circuit is used, so that the output of the value holder circuit is suitably maintained at the condenser-charged value which it achieved after the actuation of its controlled gates.

The preferred embodiment of subject invention can be more clearly understood in relation to a typical problem to be solved.

A particularly representative use of the invention is in an aircraft monitoring system such as that described in U.S. Pat. No. 3,504,335, entitled "Aircraft Takeoff Monitoring System," by myself and Roland H. Siebens, and assigned to a common assignee.

Figure 2:
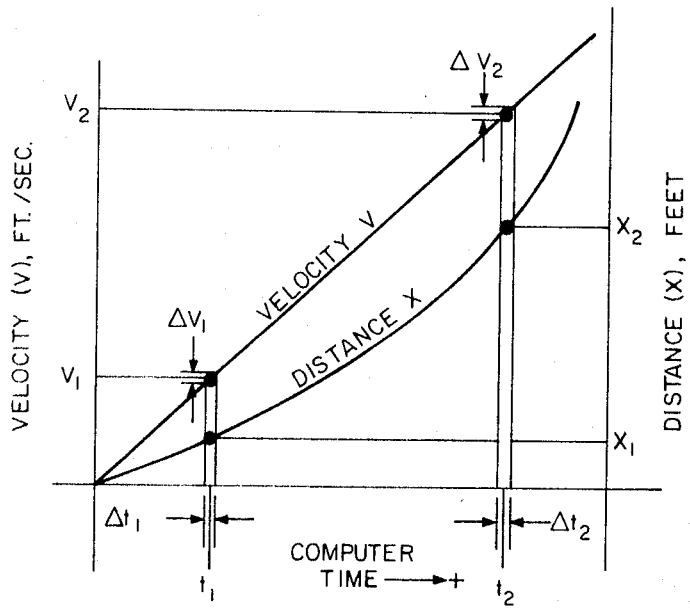
FIG. 2 is a graph of velocity and distance versus time which is presented as an aid in understanding the problem which the invention seeks to solve.

Referring now to the graph of FIG. 2, assume that an aircraft, having onboard computers and accelerometers, is in the process of "taking off" The aircraft's monitoring system senses acceleration accurately, integrates the acceleration in real time for present velocity and integrates velocity in real time to obtain present distance from start of takeoff run or some other suitable initial conditions. In order to predict a successful take off, it must predict reaching velocity $V_2$ (the takeoff velocity) at a distance $X_2$ which is at least equal to or less than the length of the runway. Since present velocity $V_1$ and present distance $X_1$ (as referred to time $t_1$) and takeoff velocity are all known, takeoff distance $x_2$ can be found in computer time by equating the time $t_2$ to velocity $V_2$ and the distance $X_2$ found by sampling the distance curve at the instant $v_2$ occurs.

Essential to accurate sampling is the minimization of the values of $\Delta t_1$ and $\Delta t_2$ and, further, the assurance that $\Delta V_1$ and $\Delta V_2$ are accurately registered with respect to $V_1$ and $t_1$, $V_2$ and $t_2$. The manner of accomplishing these goals is described in terms of the preferred embodiment of the invention.

Figure 3:
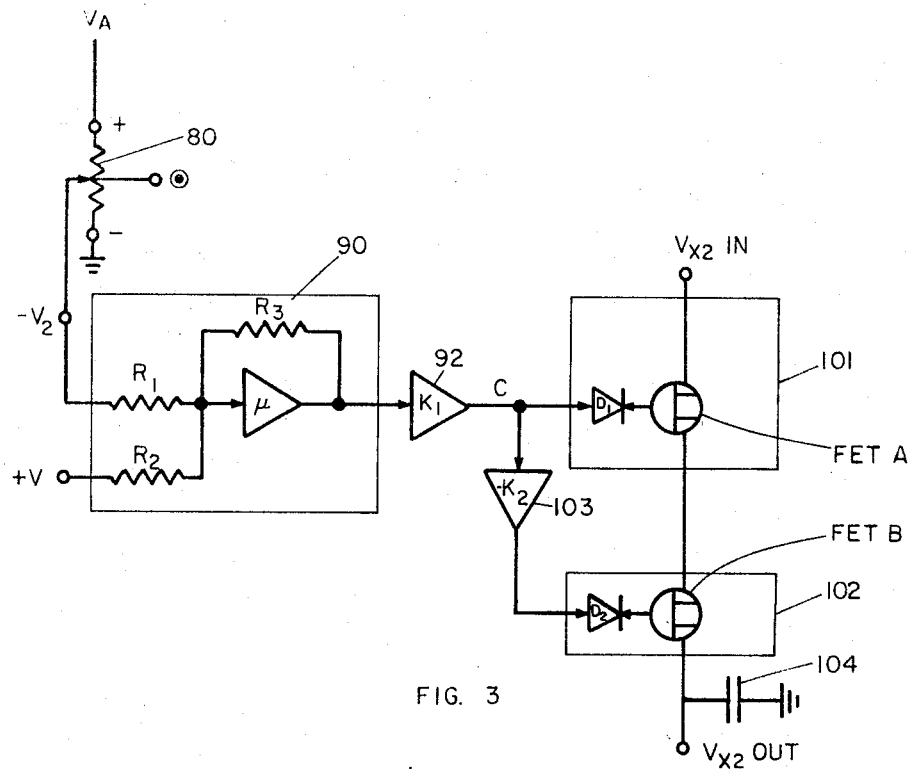
FIG. 3 is a more detailed block diagram of a preferred embodiment of the invention depicted in FIG. 1.

The sample and hold circuit of FIG. 3 is a preferred implementation of the circuit of FIG. 1 described in terms of the velocity and distance versus time problem shown in FIG. 2. Referring now to FIG. 3, the negative precalculated value of $v_2$ (applied voltage $V_a$ through potentiometer 80) is fed to summing amplifier 90, comprising resistors $r_1$, $R_2$ and $R_3$ coupled to amplifier $\mu$. Likewise, positive values of velocity V are also fed to summing amplifier 90 and are continuously summed with the constant value of $v_2$. These continuously summed velocities are amplified by amplifier 92 (gain $K_1$) to generate control signal (voltage) C. (It is understood that the control the control signal may represent values other than velocity depending on the particular problem to be solved.) Control signal c is then fed to gates 101 and 102 as shown.

Since gates 101 and 102 in the preferred embodiment comprise Field Effect Transistors (FET's) having P-channel junctions, these gates have a positive "pinch-off" voltage, i.e., the gates conduct as long as the voltage remains below some predetermined positive value. Further, as shown in FIG. 3, control signal C from amplifier $K_1$ is negative, rising in value in the positive-going direction.

Figure 4:
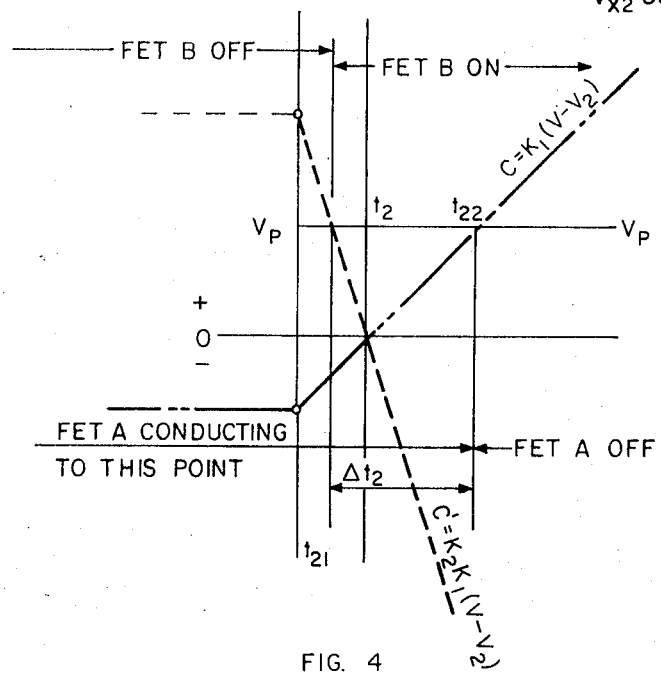
FIG. 4 shows a graph useful in describing the overall operation of the sample and hold circuit of the invention.

Referring now to FIG. 4 in conjunction with FIG. 3, control signal C is fed through diode $D_1$ to FET A 2)gate 1and simultaneously through operational amplifier 103 (gain $K_2$) and thence through diode $D_2$ to FET B of gate 102. Diodes $D_{1\ FET}$ $_{and\ D2}$ are employed here to prevent forward biasing when the voltage to the FET's rises above the "pinch-off" voltage level. Since control signal C $[K_1(V-V_2)]$ is negative, as aforementioned, FET A remains conducting until time $t_{22}$ when the "pinch-off" voltage $V_p$ of this type FET is reached.

As noted, control signal C has also been transmitted to operational amplifier 103 having gain $K_2$. Control signal C is amplified and polarity inverted by amplifier 103 such that it becomes positive and going in the negative direction. At this point, the output from amplifier 103 is designated as control signal $C'=K_2K_1(V-V_2)$. The resulting gate voltage (i.e., signal $C'$) applied to FET B drops below the pinch-off voltage $V_p$ at time $t_{21}$ to render FET B conducting.

Hence, as illustrated in FIG. 4, between times $t_{21}$ and $t_{22}$ both gates 101 (FET A) and 102 (FET B) are conducting, enabling a conductive path between the input signal $V_{x2}$ (analogous to signal A of FIG. 1) and storage capacitor 104. Capacitor 104 thereupon charges up to the value of signal $V_{x2}$ and is retained at such value even when such voltage is removed at the time when gate 101 (FET A) becomes nonconductive.

Thus, the slopes of the two control curves $C=K_1(V-V_2)$ and $C'=K_2K_1(V-V_2)$ together with pinch-off voltage characteristics of the FET's determine the width ($\Delta t_2$) of the conductive window in time. Since both curves must pass the zero voltage axis at the same point and since zero voltage corresponds to that point in time at which $V_z$ occurs, the corresponding values of V and X are closely registered with each other.

The sample and hold circuit described above provides an output signal which is equal to the value of an input signal at a particular interval of time (i.e., the relatively small interval of time indicated by the time interval $\Delta t_2$). The output signal is essentially retained at the value it had during that short time interval until the input signal is again sampled at a later point in time.

Although the invention has been described using a concrete problem as illustration, many other uses of this circuitry will occur to those skilled in the art. Moreover, modifications of the particular circuit embodiments of the invention may occur to those skilled in the art without departing from the spirit and scope of the invention. For example, N-channel junction FET's will operate equally as satisfactorily as the P-channel junction FET's described in the preferred embodiment. In such case, the polarity of control signals C and C' would be exactly opposite to that described herein in order to operate with FET's having negative "pinch-off" voltages. Hence, the invention is not to be construed as limited to the particular embodiment as described herein except as defined by the appended claims.

What I claim is:

1. Sample and hold circuitry for providing an output signal in response to an input signal applied thereto during an interval of time and for maintaining the value of said output signal at substantially the value of said input signal for a prescribed period of time beyond said interval of time, said sample and hold circuitry comprising:
   a. storage means responsive to said input signal for providing said output signal;
   b. means for producing a first control signal;
   c. first gating means coupled to said input signal and to said first control signal, said first gating means being adapted to conduct while said first control signal remains less than a predetermined threshold value, said predetermined threshold value being greater than zero and at a first polarity, and to cease conducting when said first control signal becomes greater in value than said predetermined value at said first polarity;
   d. means responsive to said first control signal for amplifying and changing the polarity of said first control signal, thereby producing a second control signal of a polarity continually opposite to the polarity of said first control signal; and
   e. second gating means coupled to said first gating means and to said second control signal, said second gating means being adapted to conduct while said second control signal remains less than said predetermined threshold value and to cease conducting when said second control signal becomes greater in value than said predetermined threshold value, such that said first gating means and said second gating means are simultaneously conductive for said interval of time during which said input signal is applied to said storage means.

2. The sample and hold circuitry of claim 1 wherein said means for producing said second control signal comprises an amplifier, and wherein the duration of said interval of time during which said first and second gating means are simultaneously conductive by being substantially determined by the gain of said amplifier.

3. The sample and hold circuitry of claim 1 wherein said storage means is a capacitor, said input signal thereby being applied to said capacitor for said interval of time to allow said capacitor to charge up to the value of said input signal, said capacitor thereafter maintaining said charge substantially at said value for a prescribed period of time after said input signal is no longer applied to said capacitor.

4. The sample and hold circuitry of claim 1 wherein said first and said second gating means each comprise a P-channel junction field effect transistor, said predetermined value is the pinch-off voltage of said transistors, and further wherein said first polarity is positive.

5. The sample and hold circuitry of claim 1 wherein said first and said second gating means each comprise an N-channel junction field effect transistor, said predetermined value is the pinch-off voltage of said transistors, and further wherein said first polarity is negative.